United States Patent [19]
McCartney, Jr.

[11] Patent Number: 4,587,183
[45] Date of Patent: May 6, 1986

[54] EXTRUDED COMPARTMENTALIZED CONTAINER

[75] Inventor: Charles P. McCartney, Jr., Yorktown, Ind.

[73] Assignee: General Motors Corporation, Detroit, Mich.

[21] Appl. No.: 742,220

[22] Filed: Jun. 6, 1985

Related U.S. Application Data

[62] Division of Ser. No. 385,495, Jun. 7, 1982, Pat. No. 4,547,236.

[51] Int. Cl.⁴ ............................................. H01M 2/02
[52] U.S. Cl. ................................. 429/176; 29/623.1
[58] Field of Search ............... 429/151, 160, 161, 176, 429/149, 163, 186, 177; 29/623.1

[56] References Cited

U.S. PATENT DOCUMENTS

| | | | |
|---|---|---|---|
| 1,847,214 | 3/1932 | Hebbeler | 429/160 |
| 3,449,170 | 6/1969 | Thornblad et al. | 136/134 |
| 3,600,232 | 8/1971 | Daguenet | 136/134 |
| 3,650,833 | 3/1972 | Sundberg | 429/160 |
| 3,705,380 | 12/1972 | Roberts | 339/218 |
| 4,383,812 | 5/1983 | Calcagni | 425/133.1 |
| 4,460,663 | 7/1984 | Stutzbach et al. | 429/151 |

FOREIGN PATENT DOCUMENTS

| | | | |
|---|---|---|---|
| 43593 | 1/1968 | Japan | 429/160 |
| 1378655 | 12/1974 | United Kingdom | |

*Primary Examiner*—Donald L. Walton
*Attorney, Agent, or Firm*—Lawrence B. Plant

[57] ABSTRACT

A multi-cell battery container and method of making same wherein a tubular extrusion having opposing ridged and grooved walls is cut to length and divided into a plurality of compartments by partitions subsequently sealingly mated with the grooves.

1 Claim, 6 Drawing Figures

U.S. Patent  May 6, 1986  Sheet 1 of 2  4,587,183
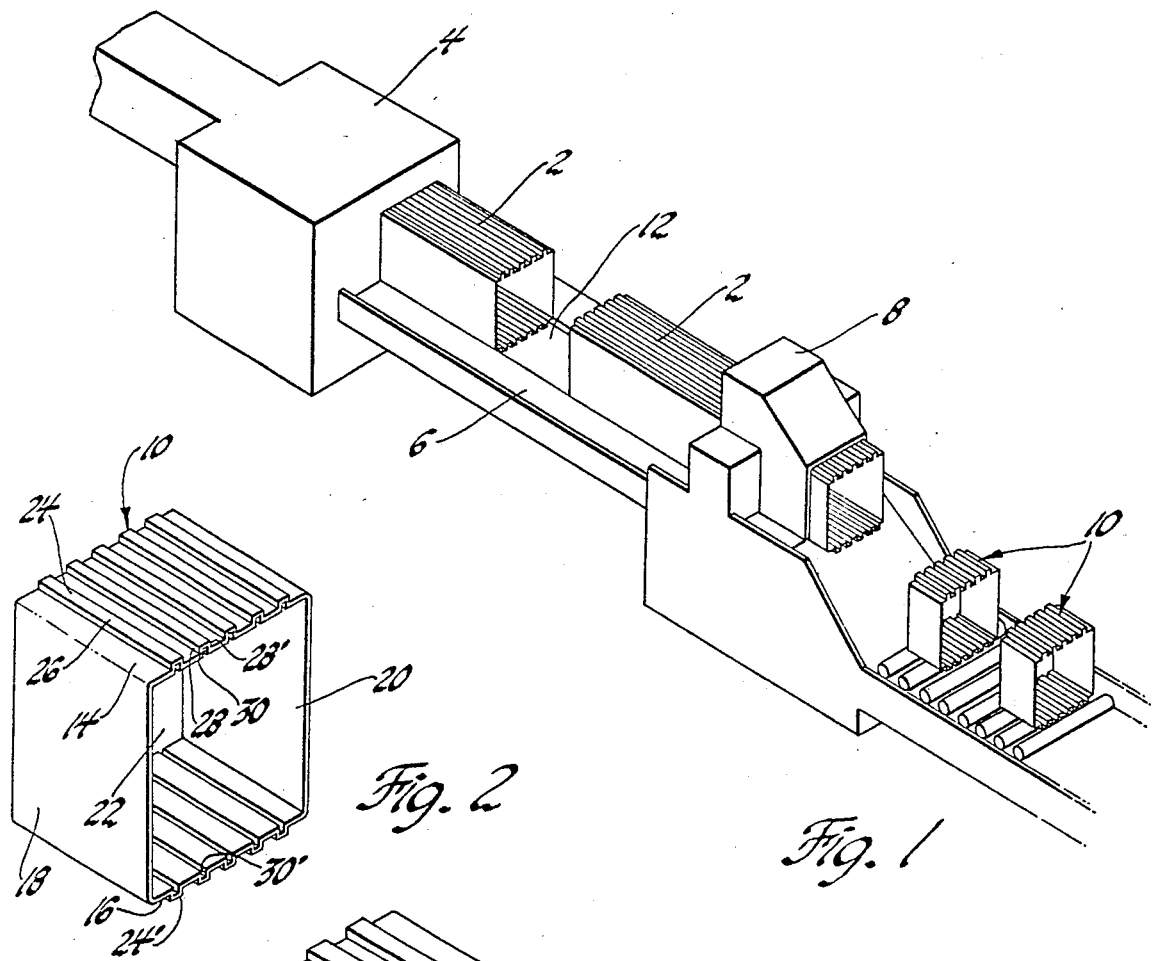
Fig. 1
Fig. 2
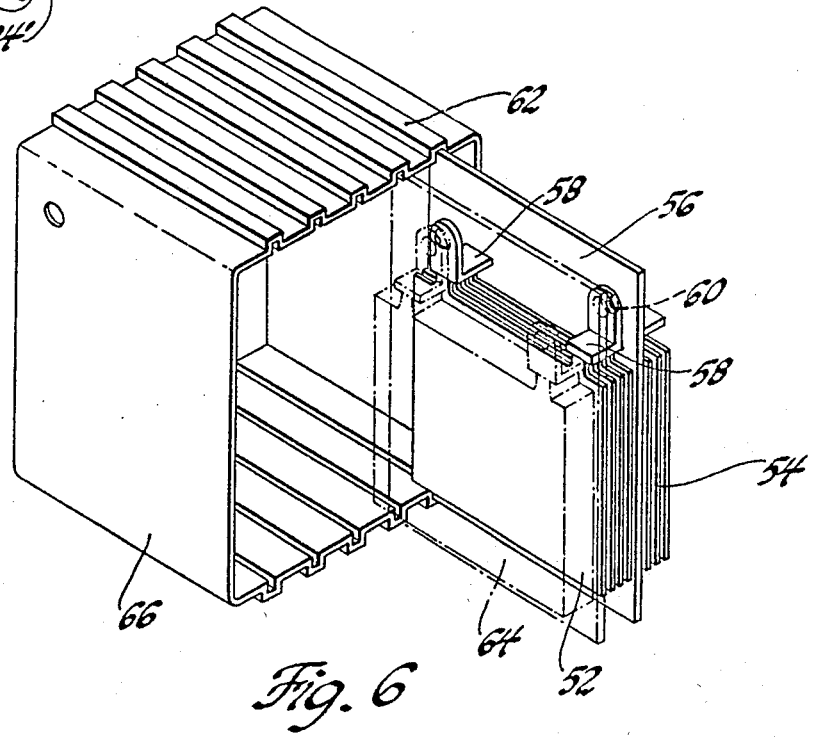
Fig. 6

EXTRUDED COMPARTMENTALIZED CONTAINER

This is a division of application Ser. No. 385,495 filed on June 7,1982 now U.S. Pat. No. 4,547,236.

This file relates to compartmentalized containers and to a method of making same. While the invention is described and illustrated in the context of a multi-cell electric storage battery container, it is to be understood that the design and construction principals are applicable to a variety of compartmentalized containers.

BACKGROUND OF THE INVENTION

Compartmentalized containers, such as multi-cell battery cases, typically have the outer shell injection molded integrally with the intercell partitions. Injection molding typically requires a separate and expensive mold for each container size and involves considerable lost production time when changing molds from one battery model to the next. After molding the containers, the intercell partitions are then perforated for receiving the intercell connectors which join the several individual cell elements (i.e., stack of alternately interleaved positive and negative polarity plates and interjacent microporous separators) within the battery. Finally, the cell elements are inserted into the narrow cell compartments and each coupled to the cell elements in adjacent compartments through the aperture in the partition as by a technique such as disclosed in Matter et al U.S. Pat. No. 3,947,290 or other known techniques. The capacity of the battery will vary according to the size of the cell elements therein and accordingly with the volumetric capacity of the container housing those elements.

British Pat. No. 1,378,655 discloses coextruding hinged intercell partitions and container shell walls to provide a collapsed but expandable multi-cell battery container. Such partition-shell coextrusion techniques require complex extrusion dies and closely controlled extrusion conditions to preclude warpage of the partitions. Moreover, once formed, conventional battery assembly techniques are still required to insert the elements and complete the intercell connections.

It is an object of the present invention to provide a unique, compartmentalized container, particularly suited to use with multi-cell electric storage batteries, and to a method of making such containers in a variety of sizes from a single simple molding die. It is a further object of the present invention to provide a battery container adapted to assembling the battery in a unique manner involving placement and interconnecting of the cell elements prior to their insertion into the container and in such a manner as to insure complete sealability of the partitions therein to prevent electrolyte migration between adjacent compartments. These and other objects and advantages of the present invention will become more readily apparent from the detailed description thereof which follows.

BRIEF DESCRIPTION OF THE INVENTION

The invention contemplates a unique compartmentalized container, process for making same and process for assembling a multi-cell battery therefrom. A thermoplastic tube of indefinite length and rectangular cross-section is extruded and cut into short segments commensurate with the volumetric capacity sought for the container. Containers of various capacities may be made from the same length of tube by merely changing the length of the segments cut therefrom. The tube segment forms the shell of the finished container and comprises two edge-joined pairs of oppositely facing walls which together define a parallelepipedial central cavity. The opposing walls of one of the pairs each has channel-like, external ridges rooted at the wall and running the length thereof. Each ridge includes an inwardly-facing groove adapted to receive and be fused to the borders of discrete partition-forming plates inserted and welded therein. The discrete plates are preferably formed by cutting-off appropriate lengths (i.e., matched to the length of the shell segment) from an indefinite length of extruded plastic strip. The plates have sealing border portions along opposite edges thereof which mate with, and are welded in sealing engagement to, the grooves in the ridges by means of ultrasonic welding heads positioned along the outside of the ridges' sidewalls. An appropriate cover member(s) is (are) welded (e.g., heat-sealed) to the shell to complete the container.

Containers made in accordance with the present invention are particularly useful in the assembly of multi-cell electric storage batteries by a process wherein the plate is perforated and cell elements joined therethrough while separated from the shell and thereafter mating and sealing the partition plates to the shell.

DETAILED DESCRIPTION OF THE INVENTION

The invention may be better understood when considered in the light of the following detailed description thereof which is given in the context of one specific embodiment described hereafter in conjunction with the several figures in which:

FIG. 1 is an isometric illustration of the shell-forming steps of the present invention;

FIG. 2 is an isometric view of a container shell segment;

FIG. 6 is an isometric illustration of a method of assemblying a multi-cell battery.

Figure 3:
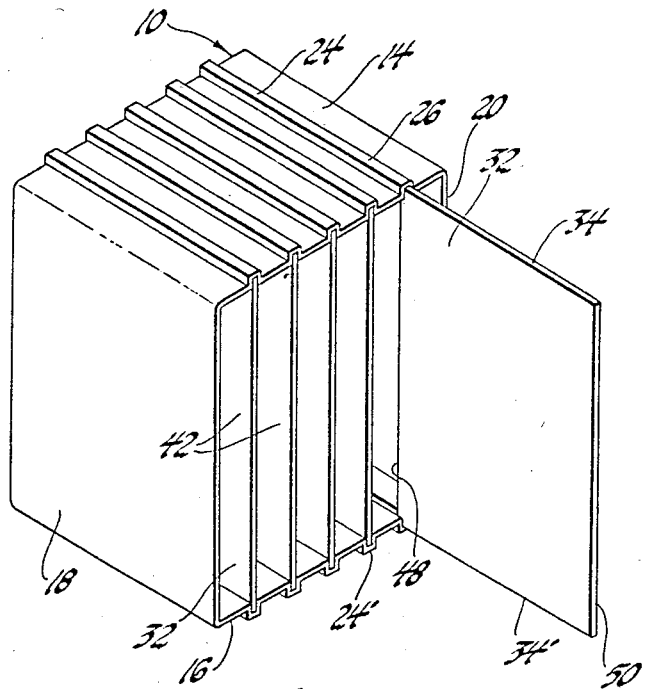
FIG. 3 is an isometric view of a container shell and partitions integrated therewith.

As best shown in FIG. 1, indefinite lengths of rectangular tubular stock 2 are extruded from an extruder 4 and carried, via conveyor 6, to cut-off device 8. The cut-off device 8 slices, saws or otherwise separates tubular stock 2 into individual segments 10 of predetermined length depending on the capacity sought for the finished container. The lengths of the segments 10 may easily be varied by merely adjusting the distance that conveyor 6 indexes the stock 2 through the cutter 8. A gap 12 may be provided between the several lengths of stock 2 to permit substantially continuous extrusion of tube lengths 2 while the previously extruded length indexes through the cutter 8. Under these circumstances the gap 12 will slowly close as the extruding stock 2 advances toward the stock 2 which experiences periodic delays as traverses the cutter 8.

Each segment 10 forms the shell of a finished container and includes a first pair of opposing walls 14 and 16 integral with, and perpendicular to, a second pair of opposing walls 18 and 20. These several walls are joined along their edges to define a parallelepipedial internal cavity 22. The opposing walls 14 and 16 of the first pair each include at least one longitudinally extending ridge 24. Additional ridges may be used and will depend on the number of compartments sought for the particular container. The ridge 24 runs the full length of the segment 10 in the direction of extrusion and comprises two sidewalls 28 and 28' flanking a distal wall 26 opposite from where the ridge 24 is rooted at the wall 14 or 16. The distal wall 26 and sidewalls 28—28' together define a longitudinal groove 30 coextensive with the ridge 24. The groove 30 in one wall 14 of the first pair lies directly opposite and parallel to, a similar groove 30' in the opposite wall 16 of the same pair and are both adapted to receive the borders of a partition-forming plate 32 subsequently inserted therein (see FIG. 3).

Figure 4:
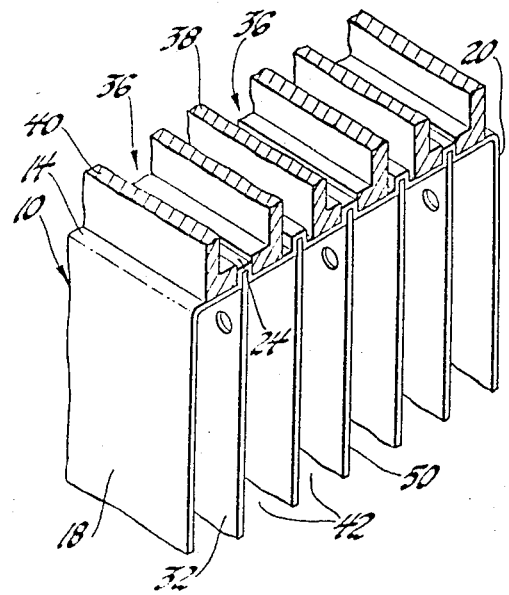
FIG. 4 is an isometric illustration of the welding step for joining the partitions to the shell.

The plates 32 each have sealable borders 34 and 34' at opposite edges thereof which, after mating with the grooves 30, are fused to the ridges 24—24' in the manner depicted in FIG. 4. In this regard, the sidewalls 28—28' of the ridges 24 are squeezed between the anvil 38 and vibratory energy imparting horn 40 of an ultrasonic welding fixture 36. High frequency mechanical vibrations (e.g., 20,000 hertz) generated by the horn 40 welds the sealable borders 34—34' of the plates 32 to the inside of the ridges 24 throughout the full length thereof and such as to provide a liquid-tight seal between the adjacent compartments 42 and thereby prevent electrolyte migration and associated ionic transport therebetween.

Figure 5:
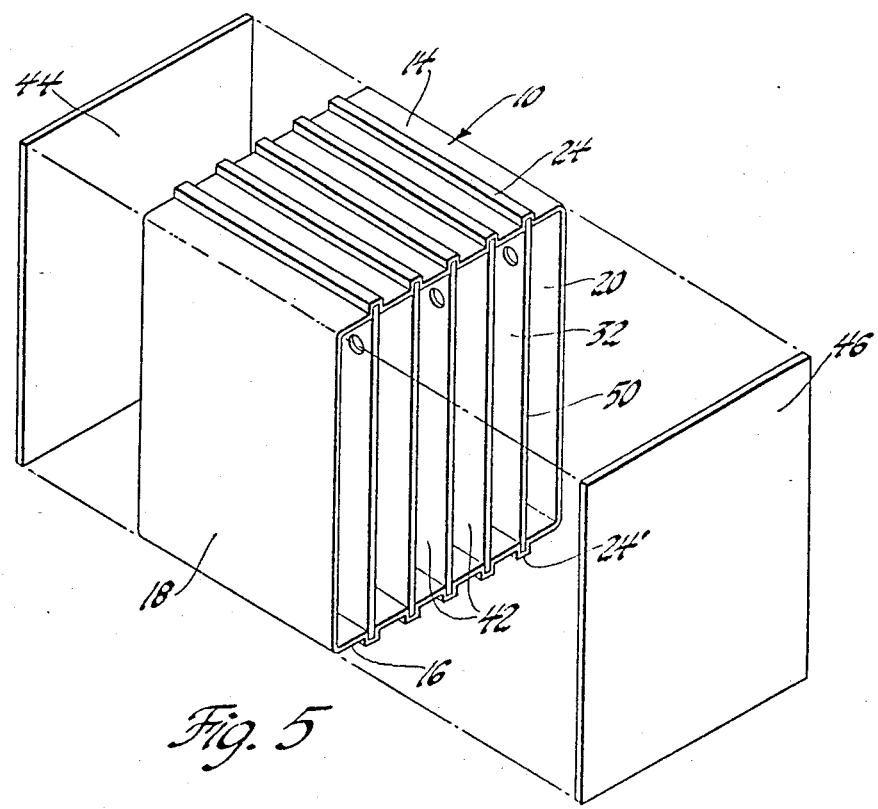
FIG. 5 is an exploded isometric view of a compartmentalized shell and covers therefor.

Following welding of the partitions 32 to the shell segments 10, appropriate cover(s) 44 and/or 26 (see FIG. 5) are joined to the shell wall edges 14, 16, 18 and 20 and plate edges 48 and 50 to provide a liquid-tight joint therebetween. This is most conveniently accomplished by locally heating the cover and corresponding edges of the walls and plates and then pressing them together while they are still soft in accordance with conventional heat-sealing techniques.

FIG. 6 depicts a method assemblying a multi-cell electric storage battery. In this regard, the intercell connector apertures 60 are punched and cell elements 52 and 54 (i.e., on opposite sides of partition 56) are joined one to the other via plate straps 58 before the plate 56 is mated and welded to the ridge 62. Performing these operations outside the shell can simplify these assembly operations and the production apparatus required therefor. While only two cell elements are shown concretely in FIG. 6, all of the cell elements and partitions would be so assembled outside the shell 66 (i.e., see phantom element 64) and the stack so formed then integrated into the shell 66. Thereafter appropriate final covers (not shown) are provided.

While this invention has been disclosed in terms of specific embodiments thereof it is not intended to be limited thereto but rather only to the extent set forth hereafter in the claims which follow.

The embodiments of the invention in which an exclusive property or privilege is claimed are defined as follows.

1. A multi-cell battery container having a shell portion adapted to receive covers at opposite ends thereof and comprising a rectangular, tubular extrusion having a first pair of opposing walls integral with, and at right angles to, a second pair of opposing walls, said walls together defining a central cavity for containing the battery's several cells;

said walls of said first pair each having an external ridge extending the length of said wall between said ends and parallel to said second pair of walls, said ridge having a channel-like configuration including opposite-facing sidewalls defining therebetween an elongated groove coextensive with said ridge and opening into said cavity, the groove in one said ridge being directly opposite the groove in the other said ridge across said cavity; and at least one partition extending between said first pair of opposing walls parallel to said second pair and dividing said cavity into at least two compartments, said partition having sealing borders extending along opposite edges thereof and mating with said grooves, each said borders lying between, and fused to at least one of, said groove-defining sidewalls so as to secure said partition to said first pair of walls and seal-off adjacent compartments one from the other against ionic transport therebetween when said container is filled with electrolyte.

* * * * *